(12) United States Patent
Stapelbroek Trennepohl

(10) Patent No.: US 11,104,197 B2
(45) Date of Patent: Aug. 31, 2021

(54) VERTICAL LIFTING SYSTEM FOR USE IN FARMING MACHINES

(71) Applicant: Stara S/A Indústria De Implementos Agrícolas, Não-Me-Toque (BR)

(72) Inventor: Átila Stapelbroek Trennepohl, Não Me Toque (BR)

(73) Assignee: Stara S/A Indústria De Implementos Agrícolas, Não-Me-Toque (BR)

( * ) Notice: Subject to any disclaimer, the term of this patent is extended or adjusted under 35 U.S.C. 154(b) by 89 days.

(21) Appl. No.: 16/304,918

(22) PCT Filed: May 11, 2017

(86) PCT No.: PCT/BR2017/000047
§ 371 (c)(1),
(2) Date: Nov. 27, 2018

(87) PCT Pub. No.: WO2017/205949
PCT Pub. Date: Dec. 7, 2017

(65) Prior Publication Data
US 2020/0180380 A1    Jun. 11, 2020

(30) Foreign Application Priority Data

May 30, 2016    (BR) .................. 10 2016 012232-5

(51) Int. Cl.
*B60K 17/14*    (2006.01)
*B60G 17/00*    (2006.01)
(Continued)

(52) U.S. Cl.
CPC ............. *B60G 17/00* (2013.01); *A01B 63/00* (2013.01); *B60G 3/14* (2013.01); *B60G 7/001* (2013.01);
(Continued)

(58) Field of Classification Search
CPC ...... B60G 3/08; B60G 11/28; B60G 17/0165; B60G 7/008; B60G 2800/914;
(Continued)

(56) References Cited

U.S. PATENT DOCUMENTS 4,186,815 A * 2/1980 Hart ............... B60G 17/033
180/24.08
6,036,201 A * 3/2000 Pond ............... B60G 3/20
280/5.514
(Continued)

FOREIGN PATENT DOCUMENTS

| BR | MU8702128 | 4/2009 |
| EP | 1270817 | 1/2003 |
| WO | 2012/092003 | 7/2012 |

OTHER PUBLICATIONS

The International Search Report dated Jul. 19, 2017, in PCT/BR2017/000047 filed on May 11, 2017.
(Continued)

*Primary Examiner* — Toan C To
(74) *Attorney, Agent, or Firm* — Hovey Williams LLP

(57) ABSTRACT

A vertical lifting system for use in farming machines and tools that is formed by a wheel set support arm (01) connected to an articulation support (02) using the pin (04), the articulation support (02) being connected to the wheel hub (05), which is in turn connected to the wheel rim (06). To move the assembly, a hydraulic actuator (07) is connected by the pin (08) to the wheel set support arm (01) and to the articulation support (02) by the pin (09). The height adjustment is provided by the actuator (07), and the mechanism, once actuated, travels around the inside of the wheel rim (06), remaining inside same, and protected in both height adjustment positions of the tool.

1 Claim, 5 Drawing Sheets

(51) Int. Cl.
*A01B 63/00* (2006.01)
*B60G 3/14* (2006.01)
*B60G 7/00* (2006.01)

(52) U.S. Cl.
CPC .... *B60G 2202/413* (2013.01); *B60G 2300/08* (2013.01); *B60G 2500/30* (2013.01)

(58) Field of Classification Search
CPC ........ B60G 2200/142; B60G 2200/144; B60G 2200/422; B60G 2202/152; B60G 2202/413; B60G 2204/148; B60G 2204/30; B60G 2204/421; B60G 2206/50; B60G 2300/083; B60G 2300/38; B60G 2300/40
USPC ......... 180/41, 8.5, 8.3, 900; 280/6.15, 6.157
See application file for complete search history.

(56) References Cited

U.S. PATENT DOCUMENTS

| | | | |
|---|---|---|---|
| 6,406,043 B1* | 6/2002 | Balmer | B60B 35/003 180/403 |
| 6,454,294 B1* | 9/2002 | Bittner | B60G 99/00 280/677 |
| 8,042,817 B2* | 10/2011 | Motebennur | B60G 9/00 280/5.514 |
| 8,376,078 B2* | 2/2013 | Hiddema | A01C 23/008 180/209 |
| 8,453,947 B2 | 6/2013 | Martin et al. | |
| 8,602,137 B2* | 12/2013 | Kroese | B60G 17/0165 180/41 |
| 10,245,914 B2* | 4/2019 | Kerner | B60G 17/019 |
| 2011/0073026 A1 | 3/2011 | Martin et al. | |
| 2011/0209938 A1* | 9/2011 | Basadzishvili | B60K 7/0007 180/305 |
| 2015/0102569 A1 | 4/2015 | Slawson | |
| 2016/0096407 A1 | 4/2016 | Dames | |
| 2018/0272826 A1* | 9/2018 | Moen | A01B 51/026 |
| 2019/0126701 A1* | 5/2019 | Tokach | B60G 3/20 |

OTHER PUBLICATIONS

The Written Opinion dated Jul. 7, 2017, in PCT/BR2017/000047 filed on May 11, 2017.

* cited by examiner

VERTICAL LIFTING SYSTEM FOR USE IN FARMING MACHINES

RELATED APPLICATIONS

The present invention relates, in general, to the agricultural machines sector and refers, more specifically, to a new system conception for varying the height of agricultural machines, that can be mechanically or hydraulically activated.

TECHNICAL FIELD

The present invention relates, in general, to agricultural machines and tools sector and refers, more specifically, to a new system conception for varying the height of agricultural machines and tools, that can be mechanically, hydraulically, electrically or pneumatically activated.

A particular feature of the proposed system is that the lifting mechanism is inserted in the inner part of the wheel rim of the machine or tool, i.e., the movable parts of the mechanism do not extend beyond the inner radial perimeter of the wheel rim.

BACKGROUND ART

The state of the art comprises agricultural machines provided with a height adjustment system. The adjustment is carried out by manual mechanical way (for instance, using a lifting jack), which characterizes laborious and difficult procedures, or said adjustment can also be carried out automatically using mechanical, hydraulic, electrical or pneumatic forces.

The lifting arms are usually constructed as unilateral or pantograph arms, which perform the height adjustment movement by means of a force generator, such as a hydraulic actuator. In general, such devices demand considerable space in the machine, since the moving mechanism is positioned laterally, superiorly, anteriorly or posteriorly to the wheel. This concept may affect the efficiency of the equipment; as such mechanisms may act as obstacles to certain plant crops, resulting in damage or breakage thereof. The construction and design of the machine or tool regarding to allowable and restrictive dimensions are also affected by the position of the height adjustment mechanism.

SUMMARY OF THE INVENTION

In order to overcome the inconveniences associated with the machines and tools of the state of the art, a new concept has been developed in order to allow placing the mechanism responsible for adjusting the height of the machine in the inner space of the wheel rim. The proposed invention allows an improved utilization of space of a machine or tool, as well as, the removal of the mechanism from the contacting area with plants or obstacles. Due to this contacting protection, said mechanism also has its components protected.

Other advantages inherent to the invention arise from the constructive geometry of the system, which does not allow varying the center of the rotational axis of the wheel set. Thus, when the hydraulic actuator is retracted and the machine is set to a minimum height, the center coincides with the center of the wheel. In the same way, when the hydraulic actuator is opened and the machine is set to a maximum height, said center of the rotational axis of the wheel set coincides again with the center of the wheel.

In addition, the system does not change the gauge between the wheels, i.e., the change of height adjustment of the wheel set does not interfere the adjustment of the specified gauge.

BRIEF DESCRIPTION OF THE DRAWINGS

The present invention will be described in respect to the accompanying drawings, set forth only as an example of one but not only possible embodiment of the principles of the invention, in which.

DETAILED DESCRIPTION OF INVENTION

Figure 1:
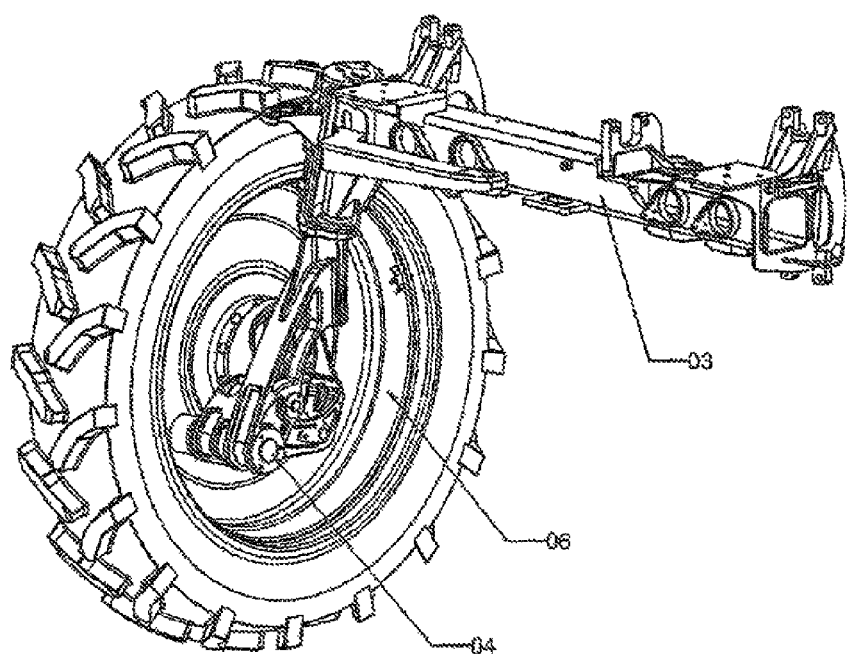
FIG. 1 represents a perspective view of the lifting system, associated with an axis cover, when the hydraulic actuator is closed.

The present invention relates to a lifting system for use in agricultural machines comprising a wheel set support arm (01), which is connected to an articulation support (02), through a first pin (04). The articulation support (02) is in turn attached to the wheel hub (05), which is attached to the wheel rim (06). To move the assembly, a hydraulic actuator (07) is connected by a second pin (08) to the wheel set support arm (01) and to the articulation support (02) by a third pin (09). The height adjustment is provided by the actuator (07), such that when the mechanism is actuated, it travels along the inner part of the wheel rim (06), remaining protected inside of it, in both height adjustment positions of the machine or tool. The wheel set support arm (01) is fixed to the axis cover (03).

Figure 2:
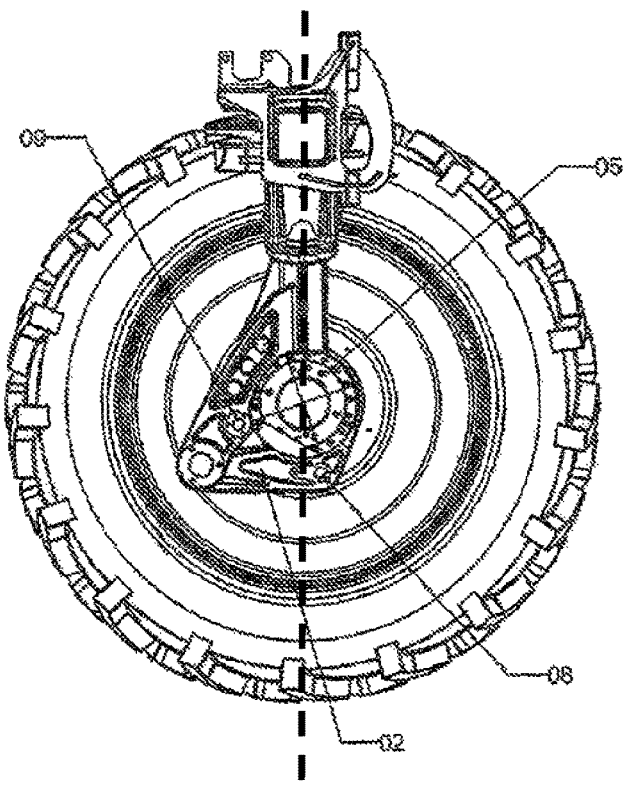
FIG. 2 represents a lateral view of the lifting system, when the hydraulic actuator is closed.
Figure 3:
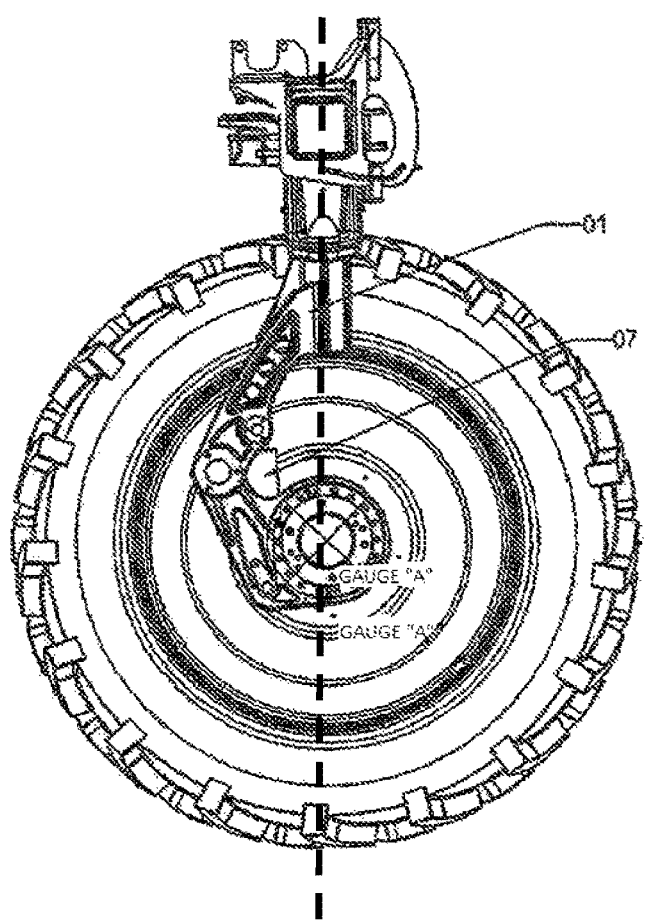
FIG. 3 represents a lateral view of the lifting system, when the hydraulic actuator is opened, in a maximum height adjustment.
Figure 4:
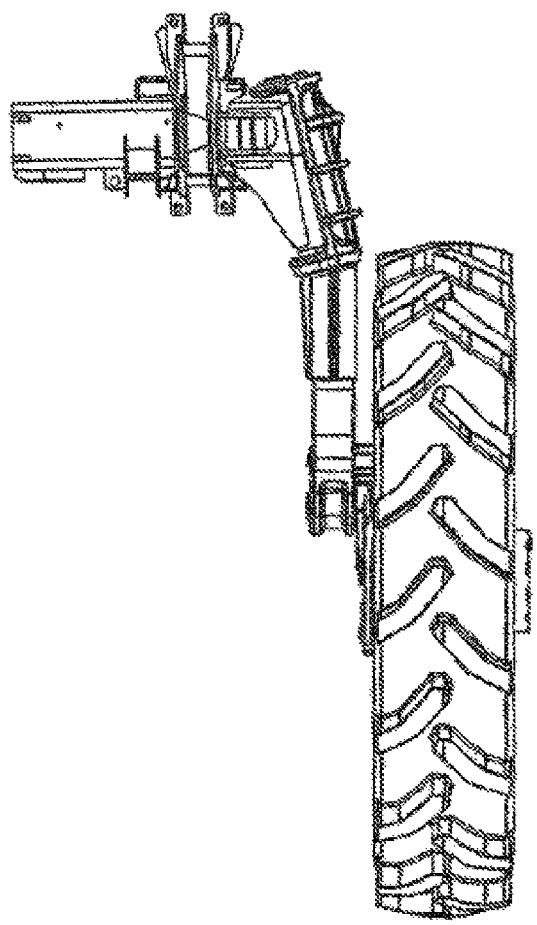
FIG. 4 represents a front view of the lifting system, when the hydraulic actuator is closed.
Figure 5:
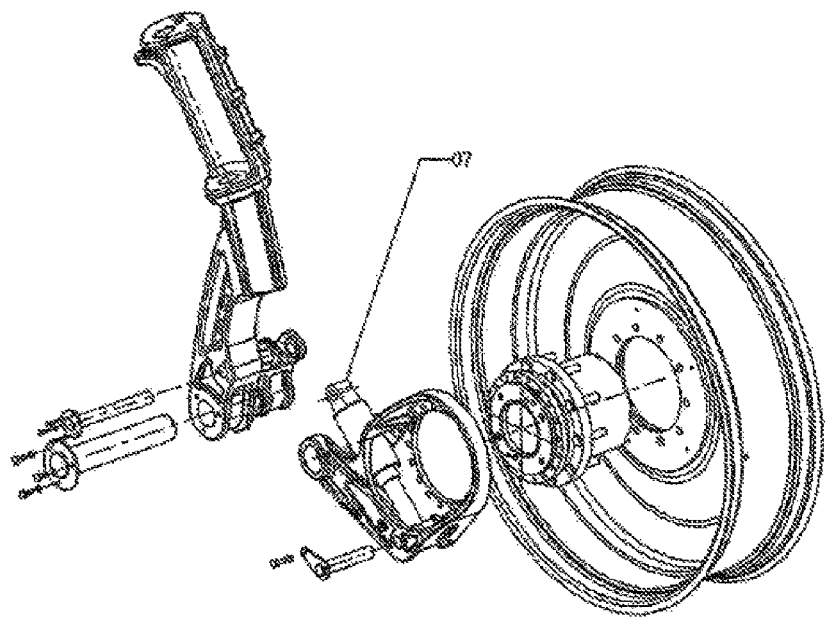
FIG. 5 represents a exploded perspective view of the lifting system.
Figure 6:
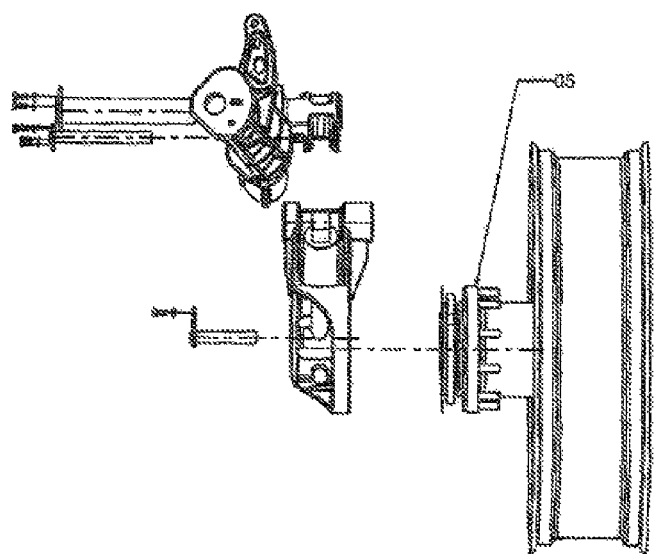
FIG. 6 represents a front view of the lifting system, with its parts separated.
Figure 7:
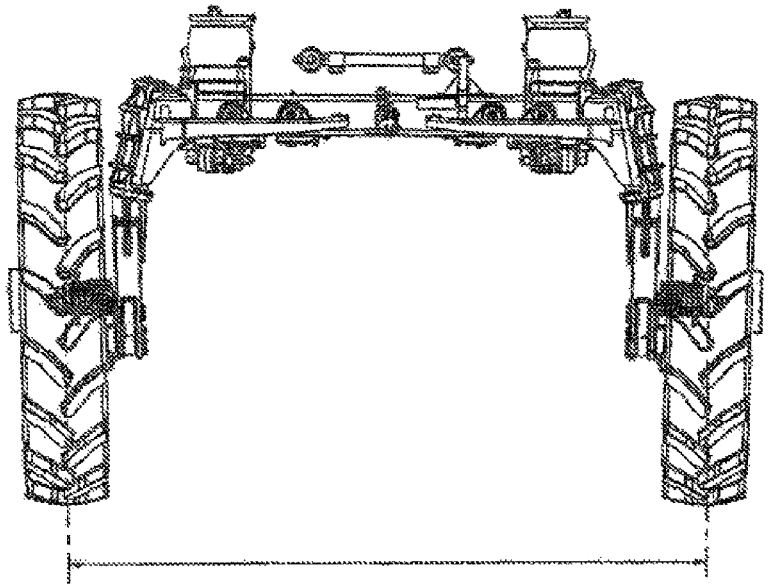
FIG. 7 represents a front view of the lifting system adjusted to a minimum height.
Figure 8:
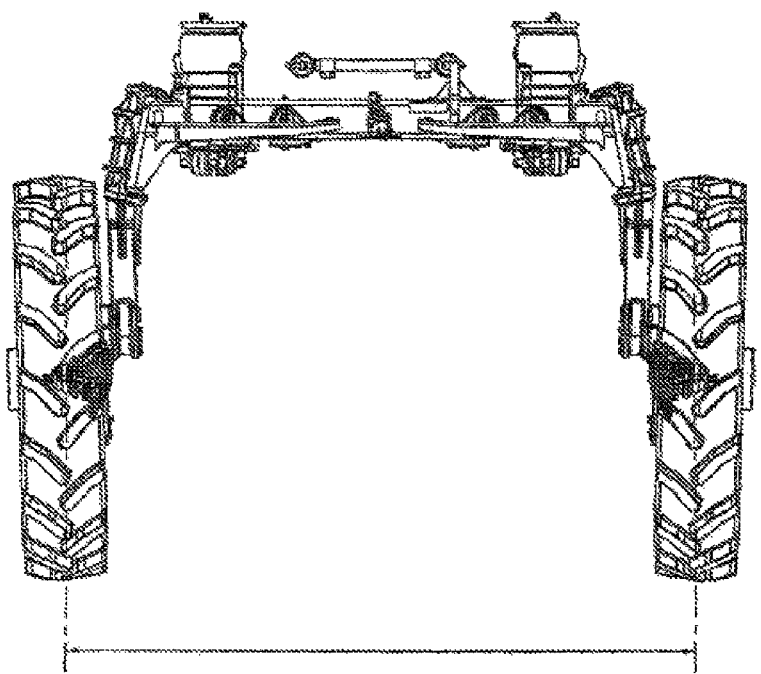
FIG. 8 represents a front view of the lifting system adjusted to a maximum height.

As can be seen in FIGS. 2 and 3, the constructive geometry of the system causes the center of the rotational axis of the wheel set not varying from the minimum height to the maximum height, keeping it coincident with the center of the wheel. In the same way, as can be seen in FIGS. 7 and 8, the system does not change the gauge between the wheels, i.e., the change of the height adjustment of the wheel set does not interfere with the adjustment of the specified gauge.

It is obvious for a person skilled in the art that a plurality of modifications, alterations and variations may be performed without departing from the scope of the present invention and that the description and drawings presented are only examples of one possible embodiment of the invention and non-limitative of the protection as claimed.

The present specification report refers to an invention involving industrial application, novelty and inventive step, which complies with all legal requirements for the claimed patent.

The invention claimed is:

1. A vertical lifting system for use in farming machines characterized by comprising a wheel set support arm (01), connected to an articulation support (02) through a first pin (04), wherein said articulation support (02) is attached to a wheel hub (05), which is attached to a wheel rim (06), and a hydraulic actuator (07) is connected by a second pin (09) to the wheel set support arm (01) and by a third pin (08) to the articulation support (02), wherein the hydraulic actuator (07) travels along an inner part of the wheel rim (06) remaining inside of it.

* * * * *